United States Patent
Kim et al.

(10) Patent No.: US 8,873,487 B2
(45) Date of Patent: Oct. 28, 2014

(54) COMMUNICATIONS DEVICE AND METHOD IN A HIGH-CAPACITY WIRELESS COMMUNICATION SYSTEM

(75) Inventors: Yun-Joo Kim, Suwon (KR); Jong-Ee Oh, Daejeon (KR); Sok-Kyu Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 273 days.

(21) Appl. No.: 13/391,904

(22) PCT Filed: Aug. 24, 2010

(86) PCT No.: PCT/KR2010/005607
§ 371 (c)(1),
(2), (4) Date: Feb. 23, 2012

(87) PCT Pub. No.: WO2011/025201
PCT Pub. Date: Mar. 3, 2011

(65) Prior Publication Data
US 2012/0155424 A1   Jun. 21, 2012

(30) Foreign Application Priority Data
Aug. 24, 2009   (KR) .................. 10-2009-0078305

(51) Int. Cl.
*H04W 4/00*   (2009.01)
*H04L 5/00*   (2006.01)
*H04W 72/04*   (2009.01)
*H04W 84/12*   (2009.01)

(52) U.S. Cl.
CPC ............ *H04W 72/046* (2013.01); *H04W 84/12* (2013.01); *H04L 5/0037* (2013.01)

USPC .......... 370/329; 370/328; 370/310; 370/350; 455/450; 455/464; 455/509

(58) Field of Classification Search
CPC ... H04W 72/04; H04W 84/12; H04W 72/046; H04B 7/04; H04L 5/0037
See application file for complete search history.

(56) References Cited

U.S. PATENT DOCUMENTS

| 2004/0264475 | A1* | 12/2004 | Kowalski ................. 370/395.5 |
| 2005/0099937 | A1  | 5/2005  | Oh et al. |
| 2005/0181833 | A1  | 8/2005  | Lee et al. |

(Continued)

FOREIGN PATENT DOCUMENTS

| KR | 1020050081040 A | 8/2005 |
| KR | 1020090128452 A | 12/2009 |
| WO | WO 2006/025680 A1 | 3/2006 |

OTHER PUBLICATIONS

International Search Report for PCT/KR2010/005607 filed on Aug. 24, 2010.

(Continued)

*Primary Examiner* — Anez Ebrahim (57) ABSTRACT

The present invention relate to a wireless communication system; and, more particularly, to a communicating apparatus and method in a high rate wireless communication system. A transmitting method of data in accordance with an embodiment of the present invention, as a transmitting method of data in a high rate wireless communication system, includes: allocating one or more bands among two or more multi-bands to each of users; and simultaneously transmitting data through the allocated bands to two or more users by using the multiple antennas for the allocated respective bands.

20 Claims, 9 Drawing Sheets

(56) References Cited

U.S. PATENT DOCUMENTS

| | | | |
|---|---|---|---|
| 2006/0240838 A1* | 10/2006 | Suh et al. | 455/454 |
| 2006/0280152 A1 | 12/2006 | Lee et al. | |
| 2006/0280154 A1 | 12/2006 | Kwon et al. | |
| 2007/0243839 A1 | 10/2007 | Kostic | |
| 2008/0008156 A1* | 1/2008 | Kuehner | 370/350 |
| 2008/0037502 A1* | 2/2008 | Yokoyama | 370/342 |
| 2008/0240078 A1* | 10/2008 | Thubert et al. | 370/351 |
| 2009/0122777 A1* | 5/2009 | Tao et al. | 370/343 |
| 2010/0061325 A1 | 3/2010 | Moritomo | |

OTHER PUBLICATIONS

Written Opinion of the Internatinal Searching Authority for PCT/KR2010/005607 filed on Aug. 24, 2010.

* cited by examiner

COMMUNICATIONS DEVICE AND METHOD IN A HIGH-CAPACITY WIRELESS COMMUNICATION SYSTEM

CROSS-REFERENCE TO RELATED APPLICATIONS

The present application claims priority of Korean Patent Application No. 10-2009-0078305, filed on Aug. 24, 2009, which is incorporated herein by reference in its entirety.

BACKGROUND OF THE INVENTION

1. Field of the Invention

Exemplary embodiments of the present invention relate to a wireless communication system; and, more particularly, to a communicating apparatus and method in a high rate wireless communication system.

2. Description of Related Art

A wireless communication system has been developed from a system based on audio communication into a system which can transmit high-capacity data, including multimedia data as well as various formats of high-capacity data, such as texts, pictures, and images.

Meanwhile, although various high-capacity multimedia services are being invigorated, the performance of wireless communication systems is not high. Also, since multi-users share radio resources, the transmission speed of the wireless service felt by users is significantly low. Therefore, research into various technologies has been conducted to expand the multi-users' shared radio resources by increasing a bandwidth or improve the performance of a wireless system with respect to the multi-users by using specific beams in communication with each user with respect to radio resources of the same bandwidth.

With the direction for development of a wireless communication system, the IEEE 802.11 working group AC defined that a MAC SAP of an access point (AP) in three multi-stations including a single AP and two stations must support up to 1-Gbps performance and a MAC SAP in a wireless station for point-to-point environment requires up to 500 Mbps in order to configure a high rate wireless communication system.

Also, a feature that each AP and each STA can support the compatibility with the existing wireless LAN system (IEEE 802.11a/n system) at the same time is suggested as the requirement of the high performance wireless communication system.

However, regarding such requirements, service structures and wireless service providing methods for supporting high speed technologies are not specifically defined.

SUMMARY OF THE INVENTION

An embodiment of the present invention is directed to a data service providing apparatus and method capable of meeting requirements of IEEE 802.11 working group AC.

Another embodiment of the present invention is directed to an apparatus and method for providing a data service by expanding a bandwidth and increasing radio resources in order to meet requirements of a high performance wireless communication system.

Another embodiment of the present invention is directed to a wireless service structure capable of improving the performance of radio resources by supporting a multi-user MIMO technique at the same bandwidth, exemplary services, and a method and apparatus for supporting those services.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a communicating method in a high rate wireless communication system for communicating with multi-users by using multiple antennas includes: allocating one or more bands of a preset center frequency to different stations; and performing a communication through the respective bands of the center frequency allocated to the stations by using the multiple antennas.

When there are two or more center frequencies, the bands of the different center frequencies may be mutually non-contiguous.

When there are two or more center frequencies, the bands included in the respective center frequencies may be mutually contiguous.

The number of stations which are simultaneously allocable at the single band may be one or two.

In performing a communication, a downlink communication may be performed during a preset first time phase, and an uplink communication in which the band is allocated based on a contention may be performed during a preset second time phase after the first time phase is completed.

A start time of the first time phase may be determined by a begin frame, data may be protected during the first time phase by a preset parameter, and the first time phase may be completed by transmitting a frame for terminating the parameter.

The communication with the respective stations may be performed in timing synchronization at the respective bands during the first time phase.

The communication with the stations may be performed without timing synchronization at the respective bands during the second time phase.

The communicating method may further include a third time phase in which the communication with the stations is performed in synchronization within the second time phase.

The data transmitted through an uplink during the second time phase may include at least one of a data frame, a management frame, and a control frame.

The data transmitted through a downlink during the second time phase may include at least one of an acknowledgement frame and a data frame.

The data transmitted through an uplink during the second time phase may include at least one of a data frame, a management frame, and a control frame.

The communicating method may further include: checking whether or not an idle wireless band exists when there is an association request from a second station compatible with the high rate wireless communication system; and performing a communication by allocating an idle bandwidth to the second station when the idle wireless band exists.

The communication with the respective stations may be performed in timing synchronization at the respective bands during the second time phase.

In accordance with another embodiment of the present invention, a communicating apparatus in a MAC layer apparatus of a high rate wireless communication system for communicating with multi-users by using multiple antennas includes: an upper mapper unit configured to receive data to be provided from an upper layer of the MAC layer to a station, a user priority, and an association identity (AID) for an access point, and map the data to be provided to the station, based on the access point, by using channel status information of the access point; and a lower mapper unit configured to map the data mapped in the upper mapper unit, based on category, by using the channel status information for the access point.

The communicating apparatus may further include an access point unit queue configured to buffer data transmitted between the upper mapper unit and the lower mapper unit.

The access point unit queue may include a plurality of queues divided based on the respective access points.

The communicating apparatus may further include a memory unit configured to buffer the data mapped in the lower mapper unit in order to transfer the data to a physical layer.

The memory unit may include a plurality of queues for access categories divided based on the respective access points.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Embodiments of the present invention provide wireless communication systems which use multi-channels based on IEEE 802.11 communication systems and use a multi-user MIMO system at each channel. The wireless communication system architecture which will be described below may provide a wireless LAN environment supported by the multi-user MIMO system by using the multi-channels. Therefore, various high rate wireless services may be provided based on the wireless communication systems proposed herein.

In order to support a high rate wireless communication and a compatibility with the existing IEEE 802.11 system, 20-MHz bandwidth suggested as the minimum unit in IEEE 802.11 is used as a reference. In a high capacity wireless LAN, a bandwidth having a unit greater than the 20-MHz bandwidth may be included as a basic bandwidth unit. In order to support a compatibility with the existing LAN apparatus having 20 MHz, the high capacity wireless LAN must be able to support an operation of 20-MHz unit. More specifically, although 20-MHz bandwidth is defined as the minimum unit, a unit greater than 20 MHz, for example, 40 MHz, 60 MHz, or 80 MHz, may be included as the basic bandwidth. Also, multiple wireless channels are managed in the basic bandwidth unit of at least 20-MHz bandwidth, which will be described later.

In the exemplary embodiments of the present invention, each wireless channel may be independently operated or may be operated while matching a timing synchronization according to a type of a service or a necessity of a basic service set (BSS). Also, each channel supports a high level degree of freedom. Thus, radio resources may be more efficiently utilized by using a multi-user MIMO technique. That is, a high performance wireless system may be provided by more appropriately using a multi-channel supporting characteristic and a wireless communication technology with respect to multi-users, and a variety of services may be easily supported.

Also, a high rate wireless communication, a power management, an overlapping BSS management, and an operation (coexistence) with the existing station will be described below. Such contents disclose that the existing wireless LAN service (IEEE 802.11a/n) is supported, the compatibility is possible, and more improved service is supported.

Figure 1:
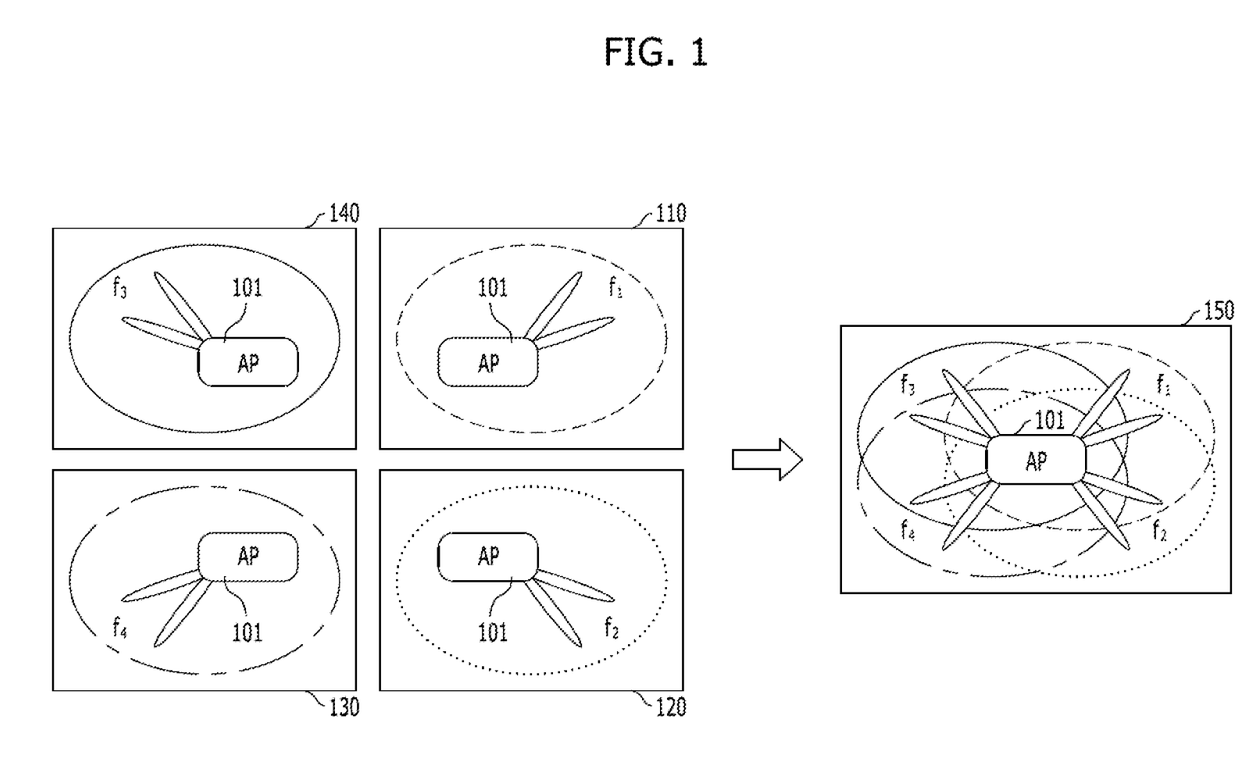
FIG. 1 illustrates a basic service structure of a very high throughput (VHT) BSS including 20-MHz multi-channels in accordance with an embodiment of the present invention.

FIG. 1 illustrates a basic service structure of a very high throughput (VHT) BSS including 20-MHz multi-channels in accordance with an embodiment of the present invention.

The VHT BSS divided into four parts 110, 120, 130 and 140 in FIG. 1 will be described. In FIG. 1, an AP 101 is a single AP. For convenience of explanation, the AP 101 is illustrated in four parts 110 to 140. That is, it should be noted that the AP 101 illustrated as indicated by reference numerals 110 to 140 is a single AP and is divided into four parts in order for explanation of operations at each center frequency.

In an example indicated by reference numerals 110 to 140, each center frequency, for example, $f_1$, $f_2$, $f_3$ and $f_4$, has multi-channels whose bandwidth is at least 20 MHz and does not exceed 80 MHz. This is a standard for a compatibility required in IEEE. 802.11. Thus, it should be noted that if applied to other systems, the bandwidth may be changed. Also, as indicated by reference numerals 110 to 140, the AP 101 may basically provide two multi-channels having the above-described bandwidth at the respective center frequencies. Also, the AP 101 includes a multi-user MIMO technique for supporting multi-users at the respective center frequencies having multi-channels.

In this regard, as indicated by reference numerals 110 to 140, the embodiment of FIG. 1 has two different channels, that is, multi-channels, at each center frequency $f_1$, $f_2$, $f_3$ and $f_4$. At this time, the channels included in one center frequency are centered on 20 MHz, and the respective channels may be allocated to different users. Since two multi-channels are provided at a band of each center frequencies, data service may be supported by allocating channels to two users at a band of each center frequencies at the same time.

As a result, as indicated by reference numeral 150, the AP 101 performs a communication using a band of four different center frequencies. Also, the AP 101 may support two different multi-channels at a band of each center frequency and provide them to two users at a band of a single center frequency. In the IEEE 802.11 system, since the channels may be allocated to two users at the same time, data may be provided to one user through the multi-channels having four different center frequencies. However, when more users are simultaneously accessed in the IEEE 802.11 system, the example of FIG. 1 may be extended and applied. Since such contents may be easily extended from the above by those skilled in the art, further description thereof will be omitted.

If the multi-channels described above are further extended, they may be supported at both a contiguous bandwidth and a non-contiguous bandwidth. Such multi-channels $f_1$ to $f_4$ will be described below with reference to FIG. 2.

Figure 2:
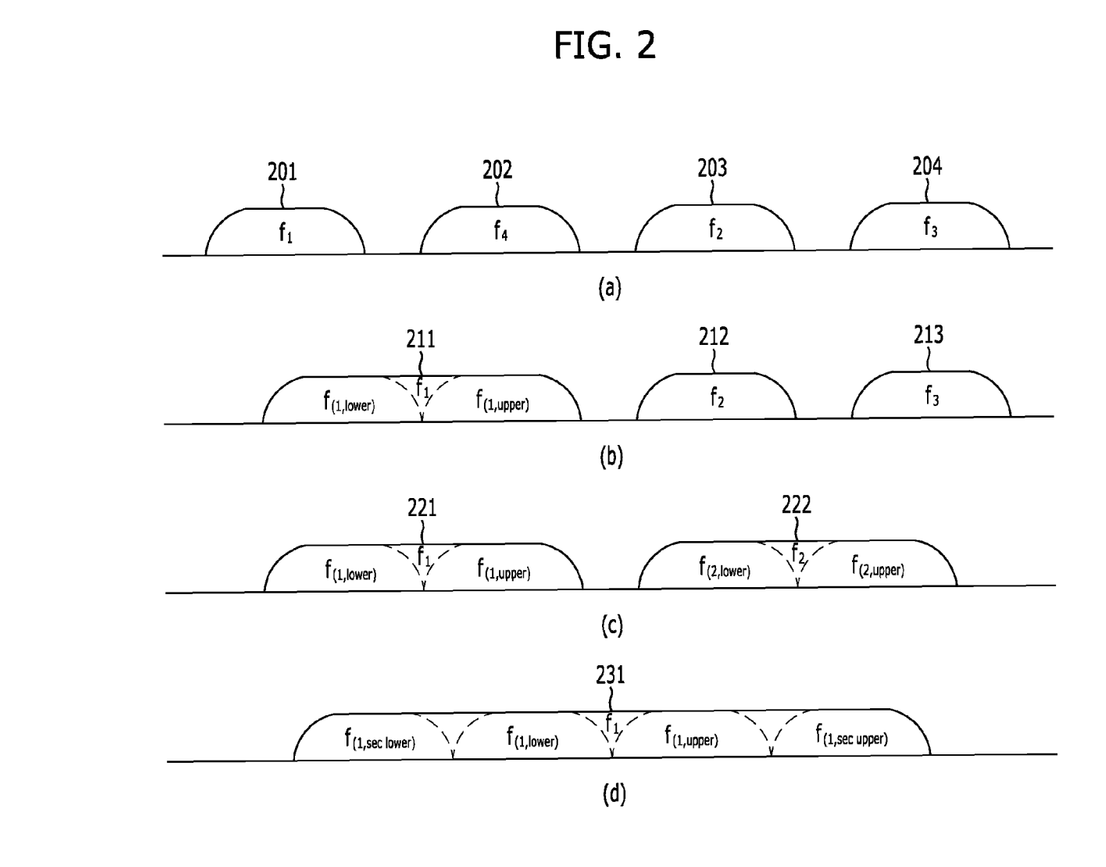
FIG. 2 is an exemplary view illustrating a structure of multi-channels in accordance with an embodiment of the present invention.

FIG. 2 is an exemplary view illustrating a structure of multi-channels in accordance with an embodiment of the present invention.

In FIG. 2, four examples which construct the multi-channels are illustrated. A method of FIG. 2(a) will be described briefly. FIG. 2(a) illustrates an example in which bands of center frequencies are non-contiguous. That is, bands are non-contiguous at a first center frequency $f_1$ 201, a fourth center frequency $f_4$ 202, a second center frequency $f_2$ 203, and a third center frequency $f_3$ 204 may be non-contiguous. That is, the example of FIG. 2(a) is the same as the structure of FIG. 1.

In a method of FIG. 2(b), a band having a partial center frequency is contiguous, and bands having other center frequency are non-contiguous. That is, a lower band $f_{(1, lower)}$ and an upper band $f_{(1, upper)}$ of a first center frequency $f_1$ 211 are contiguous. The bands of a second center frequency $f_2$ 212 and a third center frequency $f_3$ 213 are non-contiguous.

A method of FIG. 2(c) is an example of two different center frequencies. FIG. 2(c) illustrates an example in which two bands at each center frequency are contiguous. That is, a lower band $f_{(1, lower)}$ and an upper band $f_{(1, upper)}$ of a first center frequency $f_1$ 221 are contiguous, and a lower band $f_{(2, lower)}$ and an upper band $f_{(2, upper)}$ of a second center frequency $f_2$ 222 are contiguous. Also, as illustrated in FIG. 2(c), a relation between the first center frequency $f_1$ 221 and the second center frequency $f_2$ 222 is non-contiguous.

FIG. 2(d) illustrates an example in which all bands at one center frequency, that is, a first center frequency $f_1$ 231, are contiguous. That is, a second lower band $f_{(1, sec lower)}$ and a first lower band $f_{(1, lower)}$ of the first center frequency $f_1$ 231 and a first upper band $f_{(1, upper)}$ and a second upper band $f_{(1, sec upper)}$ of the first center frequency $f_1$ 231 are contiguous. Thus, all bands at one center frequency may be contiguous.

As can been seen from the above, bands of the multi-channels may be contiguous or non-contiguous according to the construction of the bands.

Figure 3:
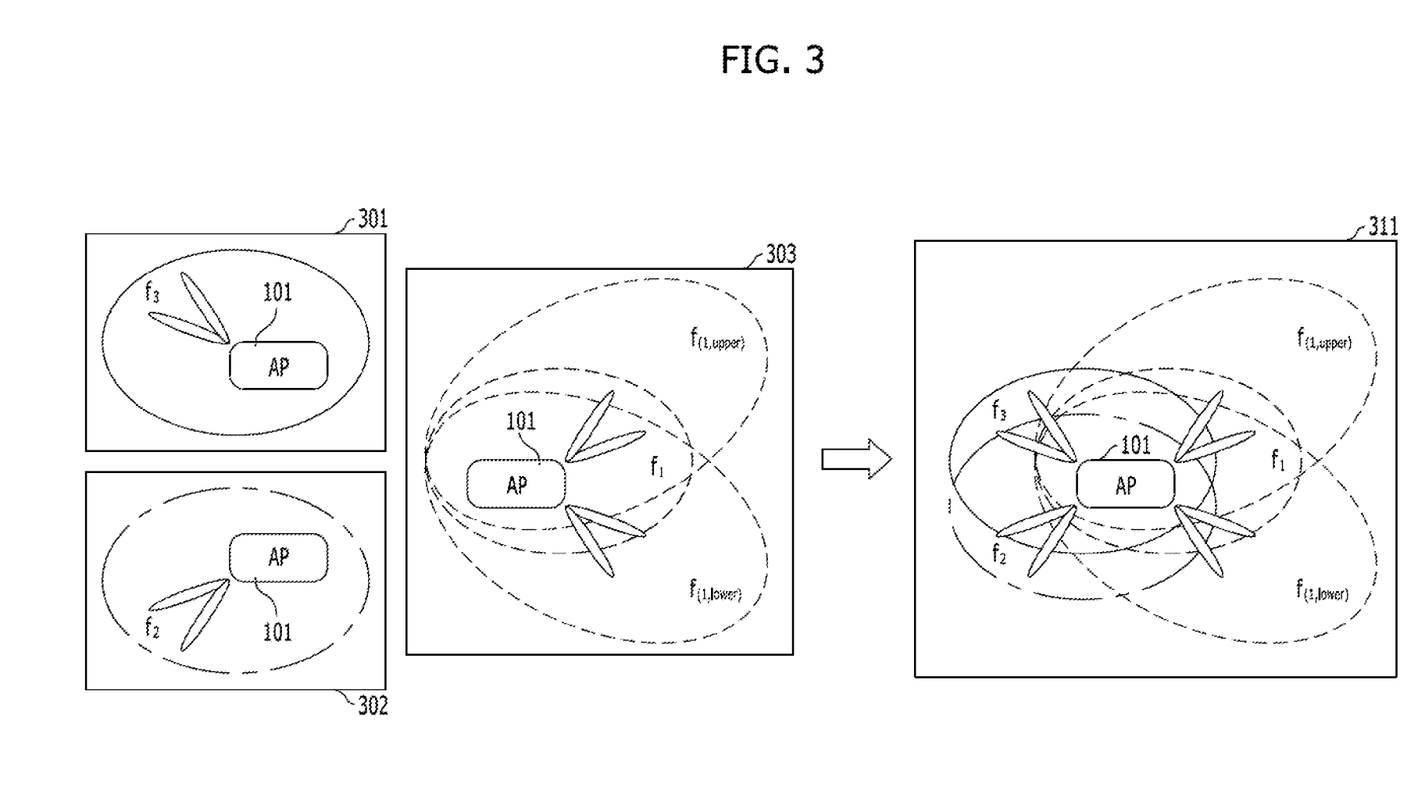
FIG. 3 illustrates a basic service structure of a VHT wireless communication system including synchronized multi-channels in accordance with an embodiment of the present invention.

FIG. 3 illustrates a basic service structure of a VHT wireless communication system including synchronized multi-channels in accordance with an embodiment of the present invention. The example of FIG. 3 is a case in which each bandwidth is 20 MHz and 40 MHz when applied to the IEEE 802.11 ac system. The example of FIG. 3 corresponds to FIG. 2(b). This will be described below in more detail.

In FIG. 3, since the AP 101 is the same as described in FIG. 1, the same reference numeral is used.

In FIG. 3, reference numerals 301, 302, and 303 are used for separately explaining the operation of the AP 101 like in FIG. 1. Reference numerals 301 and 302 in FIG. 3 correspond to reference numerals 110 and 120 in FIG. 1. That is, reference numeral 301 in FIG. 3 corresponds to a band having a third center frequency $f_3$ indicated by reference numeral 213 of FIG. 2(b). Also, reference numeral 302 in FIG. 3 corresponds to a band having a second center frequency $f_2$ indicated by reference numeral 212 of FIG. 2(b).

Also, since bands of the second center frequency $f_2$ and the third center frequency $f_3$ of FIG. 2 correspond to those of FIG. 2(b), they have a band of 20 MHz in the IEEE 802.11 system, and the bands of each center frequency may be allocated to two users.

Reference numeral 303 indicates a case in which the AP 101 has a lower band $f_{(1, lower)}$ and an upper band $f_{(1, upper)}$ at the first center frequency $f_1$. That is, the AP 101 has a lower band and an upper band which are contiguous at the first center frequency $f_1$. In the IEEE 802.11 system, the entire band of the first center frequency may be a single multi-channel having a band of 40 MHz.

As a result, the multi-channels are constructed in a form of the AP 101 of reference numeral 311. That is, the number of the multi-channels is four, and the bands of the second center frequency $f_2$ and the third center frequency $f_3$ become independent wireless channels. Also, a channel of an upper band and a channel of a lower band exist in the first center frequency $f_1$. Consequently, the VHT BSS is constructed as indicated by reference numeral 311 of FIG. 3. A multi-user MIMO technique may be applied even to the channel of an upper band and a lower band at the first center frequency $f_1$.

It can be seen from the above that the basic service structure of the VHT wireless communication system in accordance with the embodiment of the present invention has a contiguous or non-contiguous bandwidth. Also, the basic service structure of the VHT wireless communication system in accordance with the embodiment of the present invention has both a synchronous characteristic and an asynchronous characteristic in timing and data transmission/reception, which will be described later.

The exemplary center frequencies $f_1$ to $f_4$ included in the embodiment of FIG. 2 do not necessarily have specific orders and positions according to numbers 1 to 4 as illustrated in the drawing, and are only for separation purpose. Therefore, numbers may have random orders and values. For example, the center frequency $f_1$ may be located between $f_2$ and $f_3$. Thus, the numbers of the center frequencies do not determine the order of the frequencies or the specific frequency value.

Figure 4:
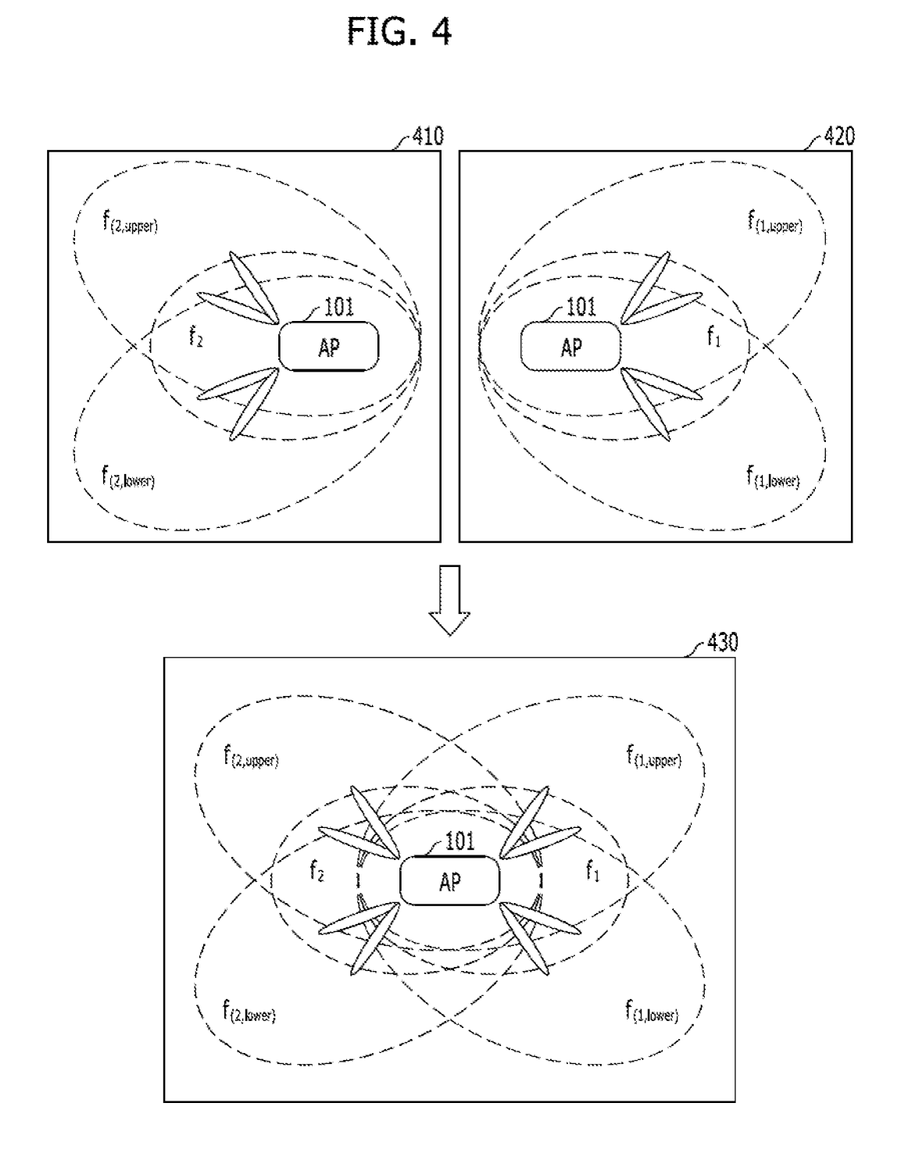
FIG. 4 illustrates a basic service structure of a VHT wireless communication system including synchronized multi-channels in accordance with another embodiment of the present invention.

FIG. 4 illustrates a basic service structure of a VHT wireless communication system including synchronized multi-channels in accordance with another embodiment of the present invention. The example of FIG. 4 is a case in which each bandwidth is 40 MHz when applied to the IEEE 802.11 ac system. The example of FIG. 4 corresponds to FIG. 2(c). This will be described below in more detail.

In FIG. 4, since the AP 101 is the same as described in FIG. 1, the same reference numeral is used. In FIG. 4, reference numerals 410 and 420 are used for separately explaining the operation of the AP 101 as described above. The combination of two operations is indicated by reference numeral 430.

Reference numerals 410 and 420 will be described below. The AP 101 may allocate channels to one or two users through the multi-channels at a 40-MHz band having a lower band $f_{(1, lower)}$ and an upper band $f_{(1, upper)}$ of the first center frequency $f_1$.

The AP 101 may also allocate channels to one or two users through multi-channels at a 40-MHz band having a lower band $f_{(2, lower)}$ and an upper band $f_{(2, upper)}$ of the second center frequency $f_2$.

That is, the bands of the first center frequency $f_1$ and the second center frequency $f_2$ have two independent wireless channels.

As a result, the VHT BSS in accordance with the embodiment of the present invention is constructed as indicated by reference numeral 430 of FIG. 4. A multi-user MIMO technique may be applied to the bands of the first center frequency $f_1$ and the second center frequency $f_2$. Also, in the VHT BSS construction of FIG. 4 including the embodiment of FIG. 1, the contiguous upper band channel and lower band channel of the first and second center frequencies $f_1$ and $f_2$ may operate as a single channel having a bandwidth of 40 MHz because they must have the synchronized timing and transmission/reception.

Figure 5:
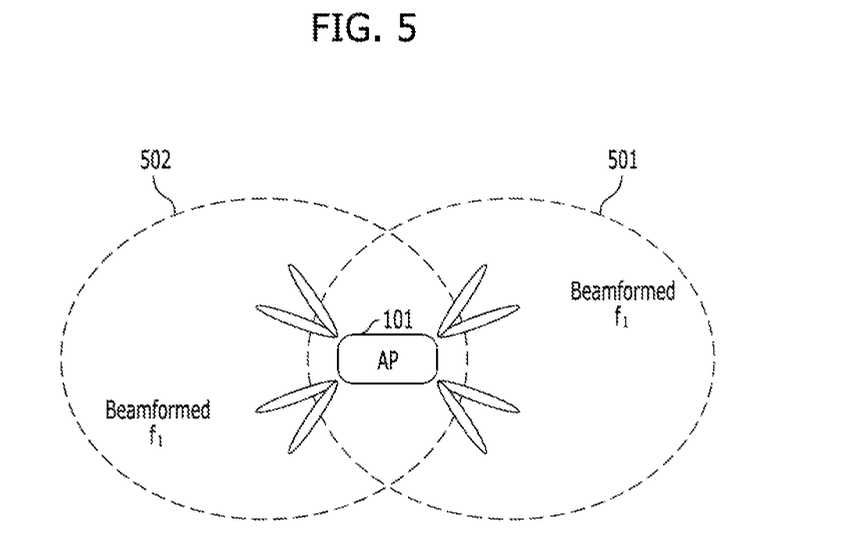
FIG. 5 illustrates a basic service structure of a VHT wireless communication system including synchronized multi-channels in accordance with another embodiment of the present invention.

FIG. 5 illustrates a basic service structure of a VHT wireless communication system including synchronized multi-channels in accordance with another embodiment of the present invention. An AP 101 in FIG. 5 is identical to that in FIG. 1. Thus, the same reference numeral is used.

The basic service structure of FIG. 5 includes the structure of FIG. 2(*d*). That is, a VHT BSS is constructed using four bands which are contiguous at a first center frequency $f_1$. FIG. 5 illustrates a case in which a beamforming is performed on the bands having the first center frequency $f_1$ so that beams are formed in a direction of a first sector 501 and a direction of a second sector 502.

That is, there are two independent wireless channels having the same bandwidth as the band at the first center frequency $f_1$. However, the beamforming is performed on the bands of the same center frequency $f_1$ so that beams are formed differently. When applied to the IEEE 802.11 system, a bandwidth of 80 MHz may be used.

As a result, the VHT SSB construction of FIG. 5 has a contiguous characteristic and the transmission/reception synchronization is matched. However, two wireless stations may use 80 MHz. In more detail, a Space Division Multiple Access (SDMA) using a MIMO technique is applied to transmit beams matched to each wireless station through an antenna.

The method for constructing the multi-channels matched to the transmission/reception synchronization at the same band has been described above with reference to FIGS. 1 to 4. This method is identical to the multi-user MIMO method of FIG. 5. Also, in the above-described examples, since the AP uses eight transmission antennas, two different beams may be transmitted using four antennas. When wireless data are transmitted/received using the multi-user MIMO method, a different number of beams may be generated according to the channel characteristic the radio BSS structure, and the network characteristic. This will be described in more detail with reference to examples.

As described above, the wireless BSS of FIG. 5 includes two wireless stations each having four antennas at a band of 40 MHz. Therefore, a service may be simultaneously received from the AP 101. An arbitrary wireless station using two antennas may request a connection to the same BSS and operate together with a station having four antennas. In this case, the wireless stations having four antennas generates beams by using two antennas in order that the AP 101 and the wireless stations having four antennas support the operation with the wireless station having two antennas. Therefore, the wireless station having two antennas may simultaneously receive up to four service supports.

As described above, the beamforming and wireless transmission method may be changed while the number of the antennas and beamforming are dynamically changed, and may be fixed during a predetermined period.

The service structure of the VHT wireless communication system in accordance with the embodiment of the present invention includes a Medium Access Control (MAC) protocol operation which will be described later. More specifically, the MAC protocol of the wireless communication system in accordance with the embodiment of the present invention is divided into a controlled phase and a content-based phase.

For example, in the content-based phase, the VHT wireless stations including the AP may perform a contention by using a channel access method of an enhanced distributed channel access (EDCA) of the MAC protocol defined in IEEE 802.11, and acquire a transmission opportunity with respect to the wireless channel. Also, in the controlled phase, a transmission with respect to the wireless channel may be performed by using a channel access method of a point coordination function (PCF) or an HCF controlled channel access (HCCA) of the MAC protocol defined in IEEE 802.11.

Figure 6:
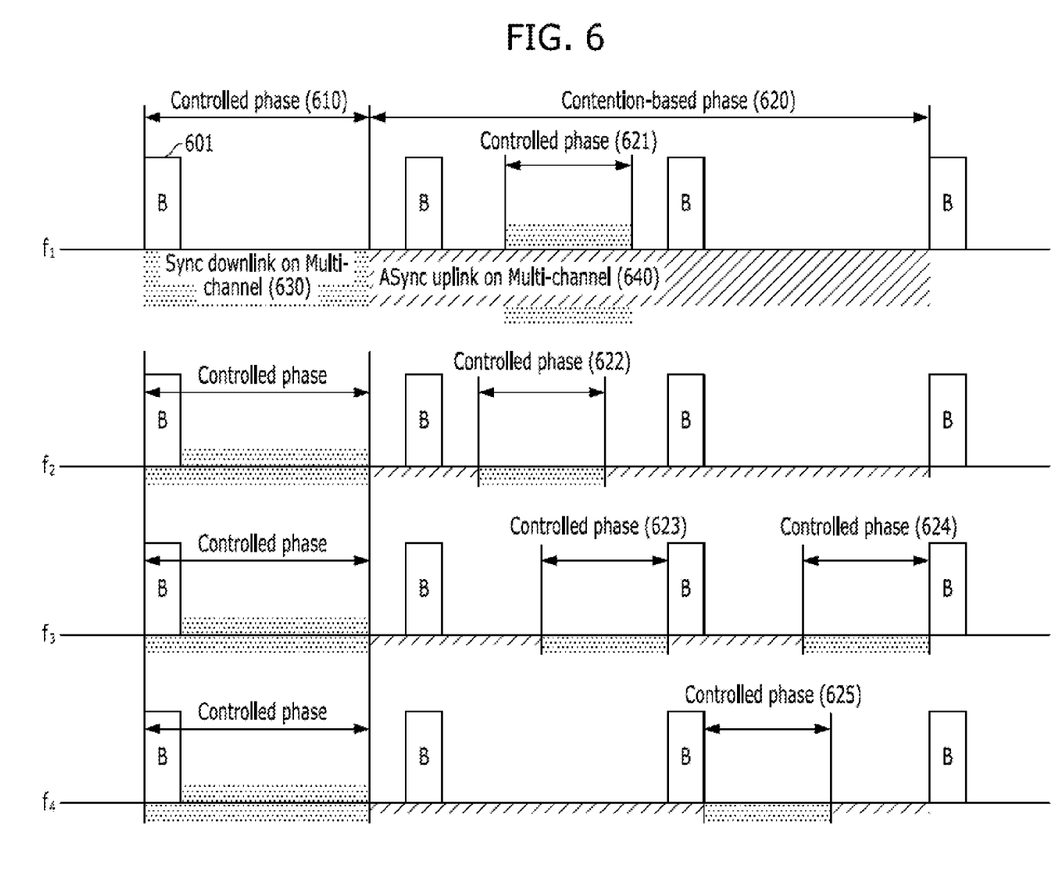
FIG. 6 is a timing diagram explaining the basic MAC operation in the VHT wireless communication system in accordance with the embodiment of the present invention.

FIG. 6 is a timing diagram explaining the basic MAC operation in the VHT wireless communication system in accordance with the embodiment of the present invention. The operation of the bands, that is, the multi-channels, at the different center frequencies $f_1$ to $f_4$ in the VHT wireless communication apparatus, for example, the VHT AP in accordance with the embodiment of the present invention will be described below with reference to FIG. 6.

The timing diagram of FIG. 6 is based on the exemplary structure of FIGS. 1 and 2(*a*). In the following description of FIG. 6, it should be noted that four center frequencies $f_1$ to $f_4$ are bands, that is, multi-channels, at the respective center frequencies.

The respective center frequencies have the same phases in which synchronization is basically matched. That is, the respective center frequencies have the controlled phase 610 and the content-based phase 220 and are synchronized according to the controlled phase 610 and the content-based phase 620. However, the multi-channels may independently operate at the respective center frequencies, and the controlled phase 610 may be operated according to the services of the respective wireless channels. That is, as illustrated in FIG. 6, when the controlled phase 610 is completed, the operation is performed in the content-based phase 620, based on the contention of the respective stations.

The controlled phase 610 is maintained during a preset timing and starts with a begin frame such as a beacon frame 601. The begin frame such as the beacon frame 601 is transmitted in preset period units. In FIG. 6, it is assumed that the beacon frame begins at time t0 and transmitted till time t1, and the controlled phase 610 is sustained from time t1 to time t2.

In accordance with the embodiment of the present invention, in the controlled phase 610, the AP 101 transmits synchronization data to the respective stations over the multi-channels through a downlink (630). That is, in the controlled phase 610, data transmission is performed based on timing synchronization. Also, the content-based phase 620 is operated after the controlled phase 610.

Meanwhile, the controlled phase 610 which can be controlled at the AP 101 may also be used for the channels acquired through the contention. In this case, it may be efficiently used in order to reduce overhead for the channel access through backoff and perform a power management or compatibility/coexistence function. On the other hand, a complexity included in a physical layer and an RF technique must be considered.

Next, the content-based phase 620 will be described below.

The content-based phase 620 is a phase in which a content-based operation is performed in order for the respective stations to acquire wireless resources. In accordance with the embodiment of the present invention, an asynchronous uplink data transmission is performed through multi-channels in the content-based phase 620 (640). That is, in the content-based phase 620, the uplink transmission is performed without timing synchronization.

As such, the contention technique using the EDCA method in the MAC protocol in which the timing synchronization is already defined in IEEE 802.11 with respect to the independent uplink service may be applied. Therefore, it is possible to solve the compatibility and coexistence with the existing IEEE 802.11 system. On the other hand, since the timing synchronization and the transmission/reception operation must be freely controlled, the complexity of the physical layer and the RF technique may increase.

Also, one or more controlled phases 621, 622, 623, 624 and 625 may exist within the content-based phase 620. In FIG. 6, two controlled phases 623 and 624 exist within the content-based phase 620 at the third center frequency $f_3$. Also, it should be noted that no controlled phase exists within the content-based phase 620. The controlled phases 621 to 625 mean that the communication is performed with the timing synchronization matched between the stations communicating the services supported at the respective wireless channels through the respective wireless channels.

Meanwhile, the operation is performed with the matched timing synchronization in the content-based phase 620 described with reference to FIG. 6. That is, upon uplink data transmission through the multi-channels, data may be transmitted with the timing synchronization. When the operation is performed with the timing synchronization, a Clear Channel Assessment (CCA) technique operating at different bandwidths may be applied. When the CCA technique is applied to perform a control with the timing synchronization at the multi-channel uplink, the complexity of the physical layer and the RF technique may be reduced.

As described above, the VHT wireless communication system in accordance with the embodiment of the present invention may be applied to both the service in which the timing synchronization of all multi-channels and the transmission/reception transmission of the antennas are supported or need not be supported, and the service in which the timing synchronization and the transmission/reception synchronization of the antennas are partially supported or need not be supported, according to the channel characteristic and the service characteristic.

Figure 7:
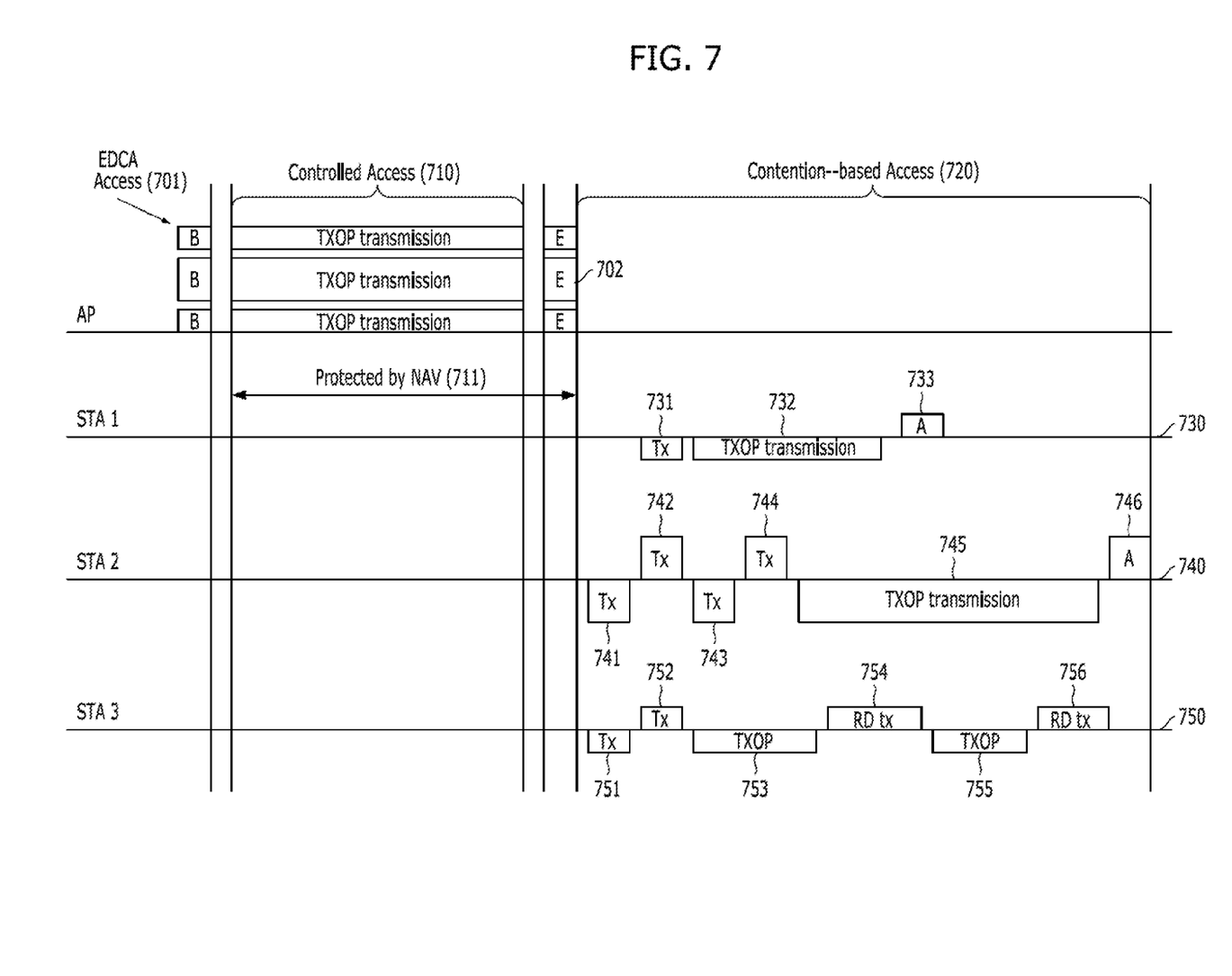
FIG. 7 is a timing diagram explaining the basic operation of the asynchronous multi-channels in the VHT wireless communication system in accordance with the embodiment of the present invention.

FIG. 7 is a timing diagram explaining the basic operation of the asynchronous multi-channels in the VHT wireless communication system in accordance with the embodiment of the present invention. Specifically, FIG. 7 is a timing diagram focused on the uplink operation between the VHT AP 101 and the wireless stations STA1, STA2 and STA3 in the VHT wireless communication system in accordance with the embodiment of the present invention.

First, a controlled access phase 710 is a part of the controlled phase 610 described above with reference to FIG. 6. After a begin (B) frame 701 of the EDCA access method is transmitted, it is delayed by a preset time and the controlled access phase 710 starts with a transmission opportunity TXOP. Although FIG. 7 illustrates the controlled access phase 710 including one TXOP transmission, the controlled access phase may be extended so that it includes one or more TXOPs according to QoS characteristic of data to be supported. At this time, examples of the begin frame 701 include a beacon frame or request to send-clear to send (RTS-CTS) frame exchange or CTS-to-Self frame. Furthermore, the begin frame may include any frame having a poll meaning and any frame having a network Allocation Vector (NAV) meaning.

In addition, as described above with reference to FIG. 6, the controlled access phase 710 is a phase in which data is transmitted with timing synchronization by the begin frame 701 and the downlink data transmission is performed. Also, in order to prevent the access of other stations during the TXOP phase, a transmission time is previously set by the NAV 711. The TXOP includes a TXOP defined in IEEE 802.11. The TXOP is further extended to a channel authority which can perform the transmission without contention and is expressed as the same time as the time set in the NAV.

When the data transmission is completed in the controlled access phase 710, the NAV setting is terminated through an end (E) frame. The end frame 702 may include any frame, which resets the NAV value, such as a CF-End frame or an acknowledgement frame. Also, a frame for terminating the NAV setting is transmitted to all channels, that is, all bands of the center frequencies $f_1$ to $f_4$ in the example of FIG. 6.

Next, the content-based access phase 720 will be described below.

Prior to a description of the content-based access phase 720, three stations STA1, STA2 and STA3 will be exemplarily described in FIG. 7. It should be noted that blocks illustrated under lines 730, 740 and 750 for identifying the stations are frames which are provided from the stations to the AP 101, and blocks illustrated above the lines 730, 740 and 750 are frames which are provided from the AP 101 to the stations. Also, in the content-based access phase 720, the access is independently performed at the respective multi-channels.

First, the transmission of the respective stations will be described below in the order of the first station STA1, the second station STA2, and the third station STA3.

The first station STA1 transmits a first data frame 731 in the content-based access phase 720, and transmits one or more data frames through the uplink during the TXOP phase 732. As described above, the TXOP means a channel authority which can perform the transmission without contention and is expressed as a time value. An acknowledgement frame A 733 is received from the AP 101 with respect to the respective transmitted frames.

The second station STA2 transmits a data frame (741), and receives a data frame from the AP 101 (742). Then, the second station STA2 transmits a data frame from the AP 101 (743), and receives a data frame from the AP 101 (744). Then, when the second station STA2 transmits one or more data frames to the AP 101 during the TXOP phase 732, the AP 101 transmits an acknowledgement A 746 to the second station STA2.

The third station STA3 transmits a data frame to the AP 101 (751), and receives a data frame from the AP 101. Then, the third station STA3 transmits one or more data frames to the AP 101 during the TXOP phase 732. In FIG. 3, the third station STA3 is a station which can receive transmission data of the AP 101 according to a Reversed Direction (RD) protocol. That is, an RD TX phase 754 means that the AP 101 transmits data together with the acknowledgement frame during the TXOP phase acquired at the third station STA3. In FIG. 7, the RX TX phase 754 of the third station STA3 briefly illustrates such procedures.

The basic operation of FIG. 7 described above is an independent and supportable basic operation of the wireless station connected to an asynchronous channel which is the content-based access phase 720.

The wireless stations supported by the synchronized multi-user MIMO technique operate as one operation among the embodiments of the basic operations of the stations illustrated in FIG. 7. Also, in the above embodiments, the RD protocol using the RD resources may be applied on to the asynchronous operation.

That is, the controlled access phase 710 and the content-based access phase 720 of FIG. 7 have been described as the embodiment in which all wireless channels within the multi-channels are asynchronous. The operation of the multi-user MIMO system has not been clearly described in the embodiments of FIGS. 6 and 7. However, from the viewpoint of the characteristics of the wireless communication system in accordance with the embodiments of the present invention, the two embodiments may be applied to the case in which the timing synchronization is matched. In other words, the TX and TXOP transmission operation of FIG. 7 in which the multi-user MIMO system is applied may comply with the MAC protocol operation defined for supporting the multi-user MIMO system.

Figure 8:
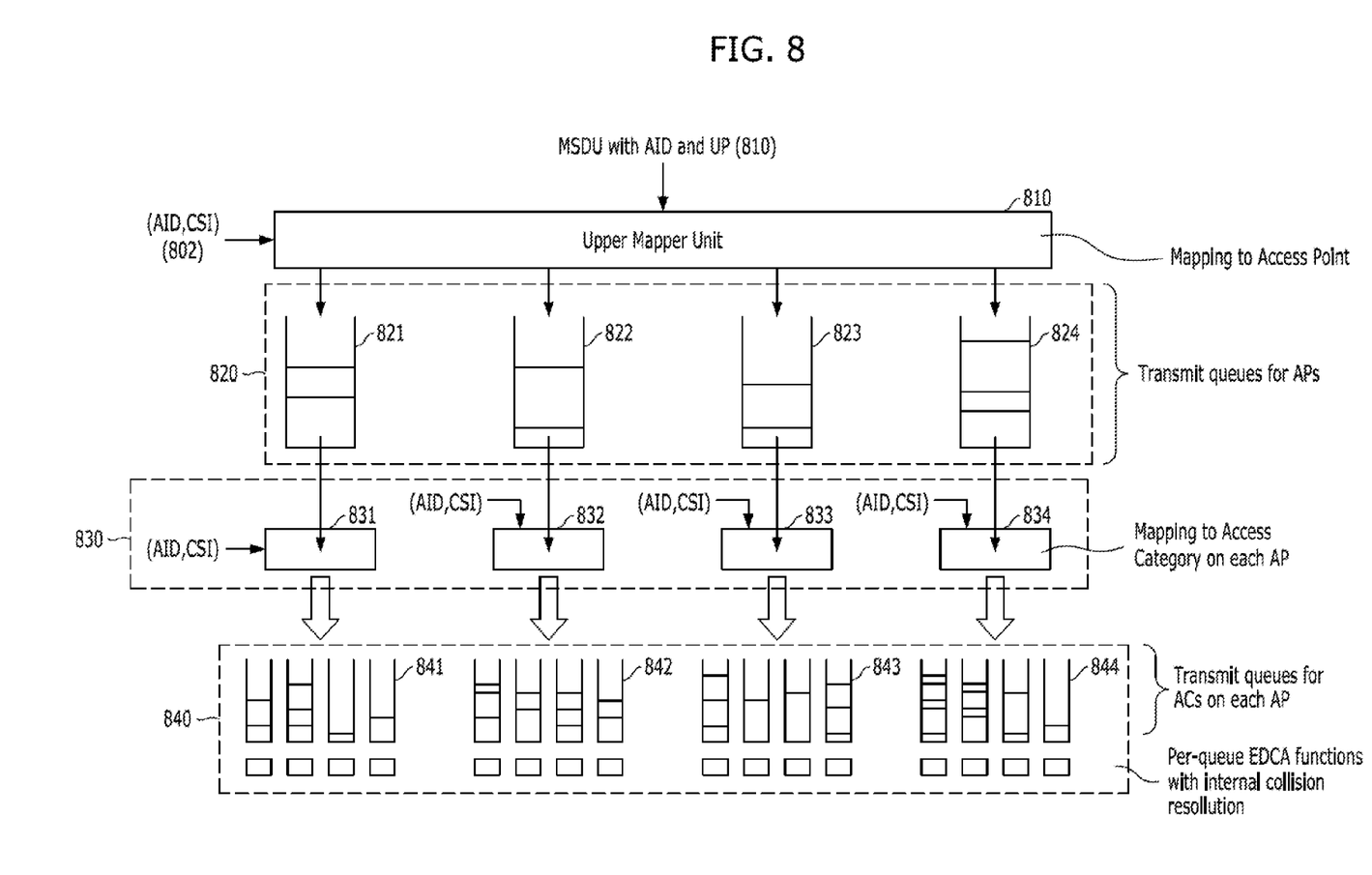
FIG. 8 illustrates a reference implementation model of the VHT wireless communication system in accordance with the embodiment of the present invention.

FIG. 8 illustrates a reference implementation model of the VHT wireless communication system in accordance with the embodiment of the present invention.

In accordance with the embodiment of the present invention, the multi-user MIMO system may be applied with respect to the respective channels, based on the multi-channels. More specifically, characteristic of data to be serviced and the channel status are selected. At the respective channels to which the multi-user MIMO system is applied, the transmission scheme may be applied according to the channel status between the transmission wireless station and the reception wireless station.

Referring to FIG. 8, a MAC service data unit (MSDU) which is data received from an upper layer of a MAC layer is transferred to an upper mapper unit 810 together with a user priority (UP) and an association identity (AID) for the AP operating the VHT BSS in accordance with the embodiment of the present invention. In FIG. 8, the AP is not the AP 101 described above, and it refers to an internal function which coordinates the respective wireless resources.

Also, the upper mapper unit 810 receives channel status information (CSI) for the respective wireless stations. The upper mapper unit 810 maps the MSDU 801 received from the upper layer into the MSDU packet in correspondence to the AP, based on the CSI for the AID, UP and AID, and provides it to an AP unit queue layer 820.

The AP unit queue layer 820 has arbitrary virtual AP unit queues 821, 822, 823 and 824. Four virtual AP unit queues 821, 822, 823 and 824 are illustrated in FIG. 8. The reason why only four AP unit queues are illustrated is that the control must be performed on the wireless channels including the four center frequencies $f_1$ to $f_4$ as described in FIG. 1, and such a role is defined as a virtual AP function and then operated. Therefore, which wireless channels are to be used is determined based on the channel information of a destination wireless station of a packet and an actual AP. In this manner, the virtual AP is determined. The packets separated by the virtual AP unit in the respective queues are again provided to a lower mapper unit 830.

As illustrated in FIG. 8, the lower mapper unit 830 includes lower mappers 831, 832, 833 and 834 corresponding to the AP unit queues 821, 822, 823 and 824. The lower mappers 831, 832, 833 and 834 classify the data, which are mapped on the respective APs at the upper mapper unit 810, based on access category of the respective APs, by using the AID and CIS values for the respective APs according to the priority designated based on the user priority (UP) for supporting QoS of the wireless data. The data classified by the lower mapper unit 830 based on the category are again inputted to a transmission memory 840.

The transmission memory 840 is divided into AP unit queues 841, 842, 843 and 844. The AP unit queues 841, 842, 843 and 844 are transmitted based on AC units by the EDCA scheme.

Therefore, when the wireless channels to transmit the data are determined through the above-described operation, the MSDU, the UP for the MSUD, and the CSI for the AID are transmitted using the input values. Also, the transmission scheme may be differently applied according to the characteristics of the channels managed at the respective channels.

When the reference implementation model of FIG. 8 uses the multi-channels as illustrated in FIG. 7, the VHT wireless communication system in accordance with the embodiment of the present invention may support the controlled phase and the content-based phase. Therefore, the respective channels may service only the frame having a specific purpose. For example, a specific channel may be used as a signal channel transmitting only a signal, or a data channel transmitting only data. On the other hand, only a specific service may be supported according to a user's requirement. For example, the channel using the band of the first center frequency $f_1$ may be used as an emergency data channel transmitting only emergency data. As another method, a contention between the multi-channels may be supported.

Figure 9:
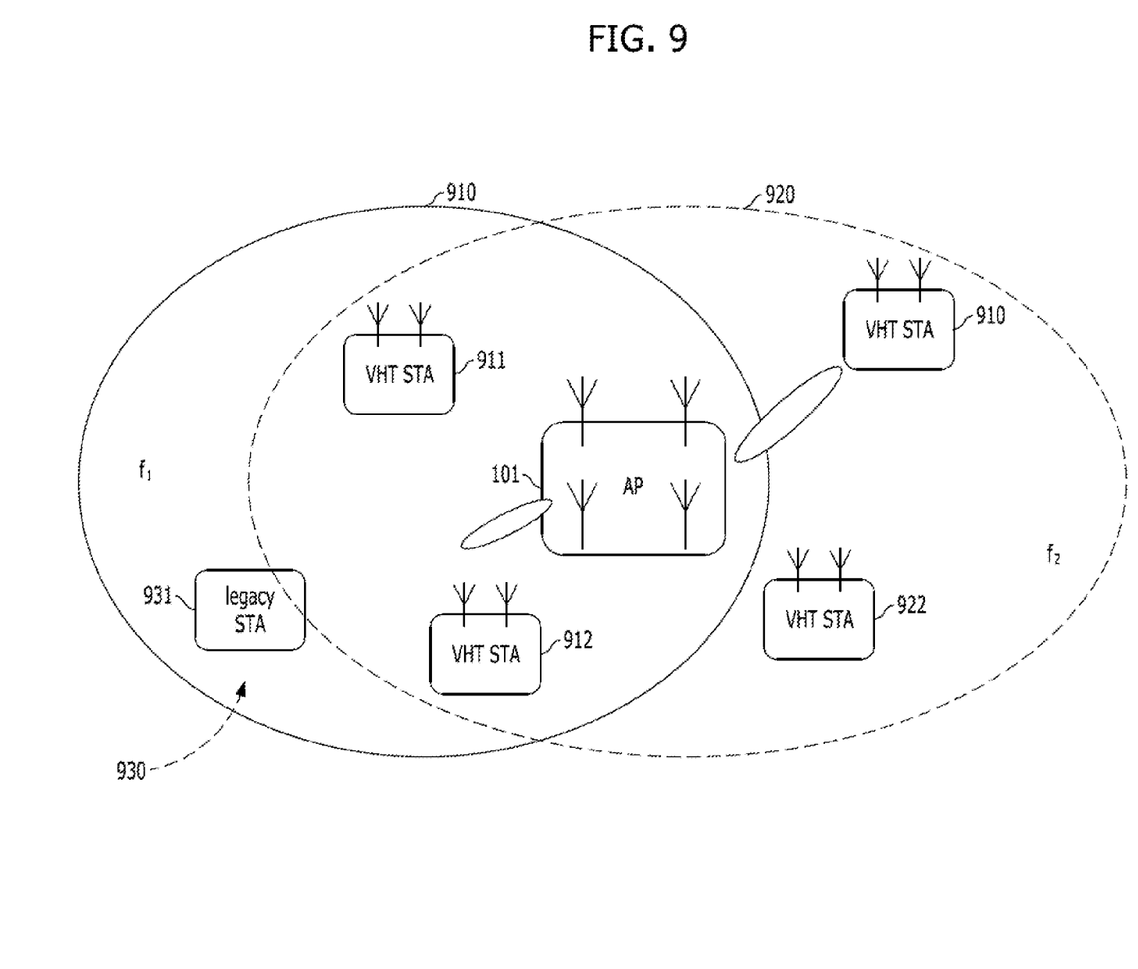
FIG. 9 is an exemplary view illustrating a service scenario in the multi-user MIMO system based on the multi-channels in accordance with the embodiment of the present invention.

FIG. 9 is an exemplary view illustrating a service scenario in the multi-user MIMO system based on the multi-channels in accordance with the embodiment of the present invention.

The AP 101 illustrated in FIG. 9 is the AP which can provide the above-described VHT service in accordance with the embodiment of the present invention. A first center frequency ($f_1$) area 910 and a second center frequency ($f_2$) area 920 with respect to the AP 101 are separately illustrated. Although they are not actually separated as illustrated in FIG. 9, it should be noted that the illustration is only for understanding the invention. Also, it should be noted that the center frequencies in FIG. 9 are the bands of the center frequencies, that is, the multi-channels.

It is assumed that VHT wireless stations 911 and 912 are included within the first center frequency ($f_1$) area 910, and the communication between the second VHT wireless station 912 and the AP 101 is performed using the first center frequency $f_1$. Also, it is assumed that VHT wireless stations 921 and 922 are included within the second center frequency ($f_2$) area 920, and the communication between the first VHT wireless station 921 and the AP 101 is performed using the second center frequency $f_2$. In this case, as indicated by referenced numeral 930, it is assumed that a legacy station 931 moves to the area 910 using the first center frequency $f_1$ among the VHT areas.

Therefore, the VHT AP 101 in accordance with the embodiment of the present invention provides the service to the second VHT wireless stations 912 at the first center frequency $f_1$ by using the multi-user MIMO system. At this time, when the legacy station 931 enters the area of the AP 101 and sends a service association request to the AP 101 as indicated by reference numeral 930, the AP 101 operates the BSS for supporting the service to the legacy station 931 by using an idle wireless bandwidth of the first center frequency $f_1$.

Accordingly, the VHT AP 101 in accordance with the embodiment of the present invention can support the compatibility with the legacy station 931 by operating the wireless channels for the legacy service. Also, when the VHT stations and the legacy station coexist, the higher QoS may be supported to the legacy station. Moreover, the complexity expected to support the service may be reduced because there is no additional burden on the compatibility function of the VHT station when supporting the legacy station.

In accordance with the exemplary embodiments of the present invention, in the existing wireless communication system whose performance is limited, the multi-channels may be independently managed and simultaneously the multi-user MIMO system may be applied at the respective channels. Thus, the wireless service performance supported to the users may be improved. Furthermore, the existing power management function and the compatibility function may be easily applied.

Moreover, the MIMO technique for the bandwidth extension and the multi-user support may be dynamically constructed according to the services. Thus, the various service supports and the performance improvement according to the free wireless network structure may be expected.

While the present invention has been described with respect to the specific embodiments, it will be apparent to those skilled in the art that various changes and modifications may be made without departing from the spirit and scope of the invention as defined in the following claims.

What is claimed is:

1. A method for communicating with multi-users in a high rate wireless communication system using multiple antennas, the method comprising:
   receiving data to be provided from an upper layer of a MAC layer to stations corresponding to the multi-users;
   receiving a user priority of the multi-users;
   receiving an association identity (AID) for an access point:
   mapping the data based on the access point by using channel status information of the access point to create first mapped data;
   mapping the first mapped data based on access category by using the channel status information for the access point;
   controlling the first mapped data on wireless channels including a plurality of center frequencies;
   respectively allocating a first band of a first center frequency among a the plurality of center frequencies to a first station and a second band of the first center frequency to a second station;
   allocating a first band of a second center frequency among the plurality of center frequencies to the first station and a second band of the second center frequency to the second station; and
   simultaneously performing communication through the first bands and the second bands with the first station and the second station by using the multiple antennas.

2. The method of claim 1, wherein, the bands of the first center frequency and the bands of the second frequency are mutually non-contiguous.

3. The method of claim 1, wherein, when a third center frequency and a forth center frequency among the plurality of center frequencies are mutually contiguous, bands of the third center frequency are allocated as a lower band of a preset center frequency, and bands of the forth center frequency are allocated as an upper band of the preset center frequency.

4. The method of claim 1, wherein the plurality of center frequencies are mutually contiguous, the bands of the first center frequency are allocated as a lower first band of a preset center frequency, the bands of the second center frequency are allocated as a lower second band of the preset center frequency, bands of a third center frequency are allocated as an upper first band of the preset center frequency, and bands of a forth center frequency are allocated as an upper second band of the preset center frequency.

5. The method of claim 1, wherein, the simultaneously performing a communication through the first bands and the second bands with the first station and the second station by using the multiple antennas includes:
   performing a downlink communication during a preset first time phase; and
   performing an uplink communication based on a contention during a preset second time phase after the first time phase is completed.

6. The method of claim 5, wherein a start time of the first time phase is determined by a begin frame, data is protected during the first time phase by a preset parameter, and the first time phase is completed by transmitting a frame for terminating setting.

7. The method of claim 5, wherein the communication is performed in timing synchronization matched between the bands of the first center frequency and the second center frequency during the first time phase, by a begin frame.

8. The method of claim 5, wherein the communication is performed without timing synchronization matched between the bands of the first center frequency and the second center frequency during the second time phase.

9. The method of claim 8, wherein the second time phase includes a third time phase matched with synchronization between the bands of the first center frequency and the second center frequency within the second time phase.

10. The method of claim 5, wherein data transmitted through an uplink during the second time phase includes at least one of a data frame, a management frame, and a control frame.

11. The method of claim 5, wherein the data transmitted through a downlink during the second time phase includes at least one of an acknowledgement frame and a data frame.

12. The method of claim 4, wherein beams on each of the bands of the preset center frequency are formed differently.

13. The method of claim 1, further comprising:
   checking whether or not an idle wireless band exists when there is an association request from a third station compatible with the high rate wireless communication system; and
   performing a communication by allocating an idle bandwidth to the second station when the idle wireless band exists.

14. The method of claim 5, wherein the communication is performed in timing synchronization matched between the bands of the first center frequency and the second center frequency during the second time phase.

15. An apparatus for a MAC layer in a high rate wireless communication system for communicating with multi-users by using multiple antennas, the apparatus comprising:
   an upper mapper unit configured to receive data to be provided from an upper layer of the MAC layer to stations corresponding to the multi-users, a user priority of the multi-users, and an association identity (AID) for an access point, and map the data to be provided to the stations, based on the access point, by using channel status information of the access point; and
   a lower mapper unit configured to map the data mapped in the upper mapper unit, based on category, by using the channel status information for the access point,
   wherein the data mapped in the upper mapper unit are controlled on wireless channels including a plurality of center frequencies, in order to simultaneously perform communication with the multi-users through the plurality of center frequencies by using the multiple antennas,
   wherein a first band of a first center frequency among the plurality of center frequencies is allocated to a first station of the stations,
   wherein a second band of the first center frequency is allocated to a second station of the stations, wherein a first band of a second center frequency among the plurality of center frequencies is allocated to the first station, and wherein a second band of the second center frequency is allocated to the second station.

16. The apparatus of claim 15, further comprising an access point unit queue configured to buffer data transmitted between the upper mapper unit and the lower mapper unit.

17. The apparatus of claim 16, wherein the access point unit queue includes a plurality of queues divided based on the respective access points.

18. The apparatus of claim 15, further comprising a memory unit configured to buffer the data mapped in the lower mapper unit in order to transfer the data to a physical layer.

19. The apparatus of claim 18, wherein the memory unit includes a plurality of queues for access categories divided based on the respective access points.

20. The method of claim 1, wherein, when the first center frequency and the second center frequency are mutually contiguous, the bands of the first center frequency are allocated as a lower band of a preset center frequency, and the bands of the second center frequency are allocated as an upper band of the preset center frequency.

* * * * *